US010628748B2

(12) United States Patent
Yu

(10) Patent No.: US 10,628,748 B2
(45) Date of Patent: Apr. 21, 2020

(54) SYSTEM AND METHODS FOR PREDICTING PROBABLE RELATIONSHIPS BETWEEN ITEMS

(71) Applicant: University of Massachusetts, Boston, MA (US)

(72) Inventor: Hong Yu, Shrewsbury, MA (US)

(73) Assignee: University of Massachusetts, Boston, MA (US)

( * ) Notice: Subject to any disclaimer, the term of this patent is extended or adjusted under 35 U.S.C. 154(b) by 323 days.

(21) Appl. No.: 15/029,765

(22) PCT Filed: Dec. 3, 2014

(86) PCT No.: PCT/US2014/068391
§ 371 (c)(1),
(2) Date: Apr. 15, 2016

(87) PCT Pub. No.: WO2015/084968
PCT Pub. Date: Jun. 11, 2015

(65) Prior Publication Data
US 2016/0239746 A1    Aug. 18, 2016

Related U.S. Application Data

(60) Provisional application No. 61/911,066, filed on Dec. 3, 2013.

(51) Int. Cl.
*G06N 5/04*     (2006.01)
*G06N 20/00*    (2019.01)
*G06K 9/00*     (2006.01)
*G06K 9/62*     (2006.01)
*G06N 7/00*     (2006.01)

(52) U.S. Cl.
CPC .............. *G06N 5/041* (2013.01); *G06K 9/00* (2013.01); *G06K 9/626* (2013.01); *G06K 9/6256* (2013.01); *G06N 7/005* (2013.01); *G06N 20/00* (2019.01)

(58) Field of Classification Search
CPC ...... G06K 9/6259; G06K 9/00; G06K 9/6256; G06K 9/626; G06N 5/04; G06N 20/00; G06N 5/041; G06N 7/005
See application file for complete search history.

(56) References Cited

U.S. PATENT DOCUMENTS

| | | | |
|---|---|---|---|
| 6,496,184 B1 * | 12/2002 | Freeman | G06K 9/00624 345/419 |
| 2003/0172043 A1 * | 9/2003 | Guyon | G06F 19/24 706/48 |

(Continued)

OTHER PUBLICATIONS

Dai et al., "Predicting Therapeutic Targets with Integration of Heterogeneous Data Sources", Jun. 2013, IAPR International Conference on Pattern Recognition in Bioinformatics, PRIB 2013, pp. 149-158 (Year: 2013).*

*Primary Examiner* — Kamran Afshar
*Assistant Examiner* — Brent Johnston Hoover
(74) *Attorney, Agent, or Firm* — Hamilton, Brook, Smith & Reynolds, P.C.

(57) ABSTRACT

The present invention relates generally to identifying relationships between items. Certain embodiments of the present invention are configurable to identify the probability that a certain event will occur by identifying relationships between items. Certain embodiments of the present invention provide an improved supervised machine learning system.

15 Claims, 7 Drawing Sheets

(56) References Cited

U.S. PATENT DOCUMENTS

| | | |
|---|---|---|
| 2005/0060102 A1 | 3/2005 | O'Reilly |
| 2006/0112111 A1* | 5/2006 | Tseng ................ G06F 17/30616 |
| 2007/0198653 A1* | 8/2007 | Jarnagin ................ G06F 19/28 |
| | | 709/217 |
| 2009/0083208 A1* | 3/2009 | Raghavan ........... G06F 17/3061 |
| | | 706/47 |
| 2010/0042944 A1 | 2/2010 | Robinson |
| 2010/0063948 A1 | 3/2010 | Virkar |
| 2010/0318509 A1 | 12/2010 | McBeath |
| 2011/0145176 A1 | 6/2011 | Perou |
| 2014/0050385 A1* | 2/2014 | Murphy ........... G01N 33/57484 |
| | | 382/133 |
| 2014/0282281 A1* | 9/2014 | Ram ................. G06Q 30/0251 |
| | | 715/863 |

\* cited by examiner

SYSTEM AND METHODS FOR PREDICTING PROBABLE RELATIONSHIPS BETWEEN ITEMS

CROSS REFERENCE TO RELATED PATENTS

This application claims the benefit of U.S. Provisional Patent Application No. 61/911,066 filed Dec. 3, 2013, which is incorporated by reference.

FIELD OF THE INVENTION

The present invention relates generally to identifying relationships between items. Certain embodiments of the present invention are configurable to identify the probability that a certain event will occur by identifying relationships between items. Certain embodiments of the present invention provide an improved system machine learning system.

BACKGROUND OF THE INVENTION

Researchers often use the scientific method to seek undocumented information or investigate occurrences related to a subject. Certain embodiments of the scientific method may include at least the steps of identifying a question about the subject, forming a hypothesis about the subject, conducting an experiment about the subject, and assessing whether the experimental results support the hypothesis. If the experimental results support the hypothesis, the hypothesis may become an experimental conclusion. If the experimental results do not support the hypothesis, then the not-hypothesis may become an experimental conclusion.

A single cycle of the scientific method may not be sufficient for a community to accept that an experimental conclusion is accurate. If an experimental conclusion is supported by many well-designed experiments, the experimental conclusion may become generally accepted as accurate or factual. However, even when accepted conclusions are supported by many, many experimental results, accepted conclusions may still be altered or overturned if new evidence renders those conclusions uncertain or unsupported.

Other elements of scientific method may include submitting results for peer review, publishing results and experimental conclusions, and attempting to replicate the experimental results obtained by the same researcher or other researchers.

While every scientific inquiry may not follow a strict scientific method, scientific inquiry almost always includes identifying some research subject and seeking to answer some question by conducting research, such as experimental research.

Also, certain experimental research may identify some results that do not specifically answer the question, do not support the hypothesis, or possibly do not provide practical solutions to a question. Such results do lead to an experimental conclusion and provide negative information about the subject. Negative information can be useful and valuable, but possibly less valuable than positive information, that is the information that results from experimental research that supports or confirms a hypothesis. To illustrate the difference between negative information and positive information, Thomas Edison is said to have tried over 2,000 different materials as light bulb filaments and found them to be unsuitable for a commercial product. This information regarding each of those 2,000 filaments that did not fit his requirements for a commercial light bulb constituted the valuable negative information generated by Edison's experiments. However, arguably the most significant and valuable experiment and respective conclusion—that was also positive information—was that he identified a material that could be used as a filament that burned for 40 hours. This material was the precursor to a practical filament useful in a commercially-viable light bulb. For purposes of this application, the term "positive information" means the solution to a problem or the answer to a question, whether incremental or partial or complete or full.

For inexperienced researchers, and even experienced researchers, it can be challenging to identify questions or hypotheses that may or are likely to lead to valuable or significant conclusions. A valuable or significant conclusion may be valuable or significant, for example, because of its importance relative to known information, possibly because it inspires other research questions and ultimately because of the monetary value assigned to the conclusion.

Researchers' educational or career options may be dependent on the significance and value of the experimental conclusions reached as a result of their research. Also, experimental research is typically time consuming and expensive. Accordingly, efficiently finding valuable or significant conclusions can be very important to a researcher.

In addition, those who provide research funds often wish to have a high likelihood of reaching valuable or significant conclusions, for example, to improve the likelihood of receiving a return on their investment or even improve the reputation of the entity that provides the funds.

Clearly, there is a need to identify research questions and hypotheses—collectively referred to as "hypotheses" for purposes of this application—that may be or are likely to result in valuable or significant conclusions. For purposes of this application, a question or hypothesis that is likely to result in a valuable or significant conclusion is termed a "quality hypothesis". A quality hypothesis or "quality prediction" is one that is shown to have an 80% or better accuracy rate. This accurate rate can be characterized for purposes of this application also as "high precision".

Some techniques have been developed which attempt to identify quality hypotheses. More specifically, certain known techniques utilize computer systems configured to more quickly or automatically identify quality hypotheses. While such known computer-implemented techniques may have some advantages, such as speed over the previously known techniques, there are certain disadvantages associated with these techniques. Generally, some known techniques are slow to implement, may provide too many irrelevant results mixed in with possibly relevant results, do not take into account all or enough relevant factors correlated with quality hypotheses, are computationally expensive, and/or have one or more other disadvantages associated with them. The following will illustrate some of the disadvantages associated with known techniques that seek to identify quality hypotheses from the perspective of research in the field of biology.

One known technique developed to identify quality hypotheses includes mining (by a computer) of published research literature for co-occurrence of concepts. This technique may utilize the ABC inference model, which states that if concept B is related to both concept A and concept C, then concept A is likely related to concept C, whether directly or indirectly. However, this technique is considered to often return low-quality results and, accordingly, requires manual intervention to facilitate the identification of quality hypotheses. As such, such approaches have generated few quality hypotheses since their inception decades ago.

Another proposed technique for identifying quality hypotheses includes reflective random indexing, an improved version of random indexing for indirect inference and knowledge discovery. This technique generally outperforms latent semantic analysis—("LSA") and random indexing to accomplish the task of predicting hidden relationship between bio-entities. However, published literature with wide ranging topics—e.g., open discovery—may cause false positive results, often characterized as "noise".

More efficient techniques for identifying quality hypotheses may be developed using supervised machine learning of the information appearing in published articles and other available information. Generally, machine learning is intended to allow computers "to learn" without being explicitly programmed. Supervised machine learning may include the steps of using a training set of information in which one or more concepts are each associated with a category. Then, uncategorized examples are inputted into the system and the machine attempts to categorize the examples through evaluation and using what it "learned" from the training set.

One challenge in using machine learning methods to identify quality hypotheses is how to generate instances for training and evaluation without introducing excess noise into the method. For example, if a pair of concepts is input as a "positive example" in the training set, it is difficult to define a "negative example", since a non-interaction between two or more concepts does not mean that it is not possible, just that it has not been found. Accordingly, this technique may introduce noise to the training set.

Clearly, there is a demand for an improved system and methods for automatically generating quality hypotheses using machine learning techniques. The present invention satisfies this demand.

SUMMARY OF THE INVENTION

Certain embodiments of the present invention are configured to automatically generate one or more hypothesis regarding information items. For example, in certain embodiments, the system and methods may be configured to identify two or more information items likely to have some relationship, such as interaction, correlation, or causation. For purposes of this application, an "information item" is any theory, segment, or discrete element forming or related to a subject. A "subject" may be a concept, construct, event, physical object—such as a miniscule physical object (that is a physical object widely accepted as being small in size such as a cell, molecule, or atomic particle), a large physical object (that is a physical object widely accepted as being large in size such as a country or the universe), or a medium physical object (that is a physical object widely accepted as being of a size that is not as small as a miniscule physical object or as large as a large physical object)—, a group of physical objects, an association between physical objects, or a separation of physical objects, to name a few. A novel hypothesis is defined as a relationship between any of the two subjects not yet discovered. Once a novel hypothesis is validated through one or more scientific experiments, it may be termed a known hypothesis or a known relation.

The present invention is based on certain recognitions including that: 1) scientific knowledge discovery is a process by people (or authors), and therefore authors' behavior (e.g., productivity of the authors, authors' research field, authors' interaction with other domain-expert) impact new hypothesis generation; and 2) Research hypotheses (both new and known hypotheses) and hypothesis discovery follow the mathematic principal of an evolving network (e.g., a graph or a map). In one embodiment of a graph or map, a node may, for example, be a biomedical entity and the link between two nodes may be considered to be a research hypothesis. FIG. 3 illustrates the use of a node to represent a protein, the link between two nodes indicates that two proteins interact with each other. The relation or hypothesis between two proteins can be validated by experiments. Those predicted and not yet validated are called novel hypotheses. Embodiments of the present invention may be based on several well-grounded mathematic principals. For example, a graph shows a power-law distribution (that is, while most nodes connect to a few other nodes, a few nodes have the highest number of connections with other nodes) and an evolving graph follows the principal of preferential attachment (that is, a node is more likely to make a new connection with a node that has the highest number of connections with other nodes). By such transformative use of information, the present invention substantially differs from all existing approaches and provides theoretic foundation to support intelligent and quality predictions of new research hypotheses. Our approach is in contrast to other approaches of finding associations based on, for example, purely text associations in literature.

One embodiment of the present invention provides an improved supervised machine learning system ("ISML"), which learns from known relations (or validated hypotheses). The ISML is configured to simulate how one or more new hypotheses are generated from known hypotheses.

Generally, certain embodiments may be configured to predict whether there is or what is the relationship between certain information items. Such embodiments may provide as output information item pairs that have a high likelihood of interaction (or other type of relationship).

To start, a collection of information items may be defined from all the possible information items. For example, certain information items may be mined from data source units (which may be stored internal or external to the system, for example, in a storage component). Examples of data source units include published articles, published abstracts, raw data, catalogued data, or other collections of information. Examples of storage components include main memory, secondary memory, databases, indexes, files, or other retention systems.

Also, in order to define the scope of information items to be included, the user may apply some criteria (e.g., time range, quality, type of item, and type of data source unit).

Once the scope of known information items is defined, a map may be built to illustrate any known relationships between the one or more information items. The collection of selected information items is termed an "interaction network". The interaction network may include only the same type of information items (e.g., all proteins coded by human DNA) or may include two or more different types of information items (e.g., proteins and drug interaction information). A map be produced that may include any symbol or group of symbols that form a graphical representation configured to easily convey information and easily be displayed.

In certain embodiment of an interaction network map, the information items may form nodes and connections. A node may be assigned a "degree", which is the number of connections the node has to other nodes. Generally, low degree nodes have few interactions with other nodes, while high degree nodes—also termed "hubs"—have many interactions with other nodes.

Next, a training set may be developed from all or some of the information items in the collection. In certain embodiments, the training set may include topic information items and publication information items.

The training set (possibly including some of the interaction network map information) may be input into a training analysis component, which may be configured to assess whether there are interactions between certain information items and then to recognize and extract features of the interaction(s). For purposes of this application, a "feature" is an individual measurable heuristic property of a phenomenon being observed. The training analysis component may be configured to produce a classifier element. Certain embodiments of a feature set may present innovations.

An evaluation set may be developed from all or some of the information items in the collection. Typically, at least some information items not present in the training set are included in the evaluation set. In certain embodiments, all of the information items in the evaluation set were not included in the training set.

The evaluation set may be input into a prediction creation component, which may be configured to apply the classifier element to determine the likelihood of interaction between one or more information items in the evaluation set.

In certain embodiments, the training analysis component, and possibly the prediction creation component may use one or more supervised machine learning models. Examples of supervised machine learning models that may be used include Naïve Bayes ("NB"), Naive Bayes Multinomial ("NBM"), support vector machine ("SVM"), and logistic regression. Certain embodiments of the classifiers resulting from these four models may perform well and may be also robust, fast, and easy to implement.

When applying a Naïve Bayes model, the training analysis component may produce a Naive Bayes classifier, which is a simple probabilistic classifier based on applying Bayes's theorem with the strong (naive) independence assumption that the features are generated independently from each other given the instance label.

A Naïve Bayes Multinomial model includes an assumption that the conditional probability of the feature given a class follows multinomial distribution.

SVMs are based on the concept of maximum margin decision planes that define generalizable decision boundaries for classification and regression. An SVM constructs a hyperplane to maximize the margin between the data points and the hyperplane, often after mapping the data points to a higher dimensional space in which they are linearly separable or close.

After a classifier is applied to an evaluation set, the output may include information related to likelihood of interaction between any two or more information items or just information item pairs. The likelihood of interaction may be termed "relationship value". The relationship value for each pair of information items may be ranked according to size and/or converted into a graphical representation for display via a display unit.

Certain embodiments of the present invention are configurable to identify the likelihood that an event will occur. As a result, a "trend" may be identified before the realization of the first event. For example, a connection between A and B may happen if the separate activities directed to A and/or B increase. Accordingly, if A is a certain protein that is believed to interact with a certain protein B, more research on A and/or B, more publications directed to A and/or B, or more collaborative efforts directed to A and/or B, may lead to the confirmation of the establishment of the interaction between A and B.

Certain embodiments of the present invention allow experts' hunches or their opinions as to what may happen with respect to a certain context or contexts to be captured and present these opinions in a collected form (e.g. a graph). Another or others by viewing this collected form (of related relations) may develop one or more new opinions, and thereby new relations. When this embodiment—based on collecting opinions and presenting them in a comprehensible form to induce new opinions, and thereby new relations—is integrated with historical information and a mathematical principle—that defines the entity relations and their growth—is applied, the future of the entity may be predicted.

Embodiments of the present invention may include additional components for quality hypothesis generation. For example, additional learning features can be added, depending on entity specific characteristics. For example, protein and disease may be considered to be two different entities, each exhibiting different sets of characteristics, each of which can lead to different features that can be added to train the SML models.

One object of certain embodiments of the present invention is to efficiently and automatically generate quality hypotheses.

Another object of certain embodiments of the present invention is to efficiently and automatically generate quality hypotheses, wherein the number of non-quality hypotheses generated by the system and methods is minimized.

Another object of certain embodiments of the present invention is to efficiently and automatically predict likelihood of chemical interactions.

Another object of certain embodiments of the present invention is to efficiently and automatically predict likelihood of protein-protein interactions.

Another object of certain embodiments of the present invention is to efficiently and automatically predict likelihood of protein-drug interactions.

Another object of certain embodiments of the present invention is to efficiently and automatically predict likelihood of drug-drug interactions.

Another object of certain embodiments of the present invention is to efficiently and automatically predict likelihood of food-drug interactions.

Another object of certain embodiments of the present invention is to efficiently and automatically predict likelihood of an event occurring.

Another object of certain embodiments of the present invention is to efficiently and automatically predict the likelihood of financial success of a pair of financial instruments.

Another object of certain embodiments of the present invention is to efficiently and automatically predict the likelihood of any two information items pairing with one another based on some guiding principles.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION OF EMBODIMENTS OF THE INVENTION

Certain embodiments of the present invention are configured to generate quality hypotheses regarding information items. More specifically, certain embodiments are configured to identify the two or more information items that have the highest likelihood of interaction.

For purposes of this application, the present invention is discussed in reference to automatically generating quality hypotheses regarding relationships between biological information items—specifically, proteins—, but the discussion is merely exemplary. The present invention is applicable to automatically generating quality hypotheses regarding any one or more information items.

Figure 1:
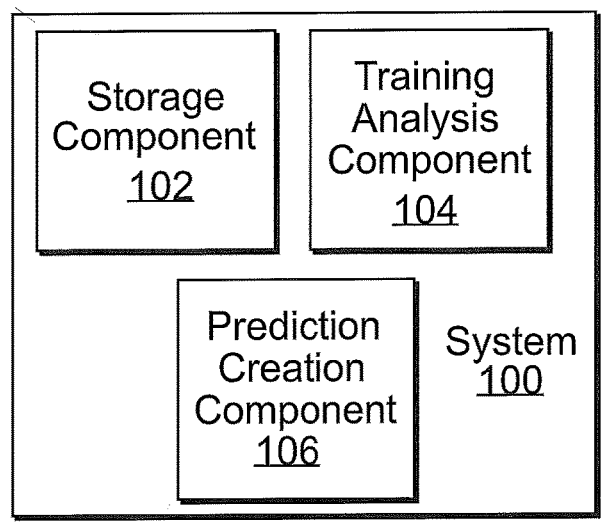
FIG. 1 illustrates an embodiment of a system of the present invention.

Certain embodiments of the present invention include a system 100 including a storage component 102, training analysis component 104, and prediction creation component 106 as illustrated in FIG. 1.

Figure 2:
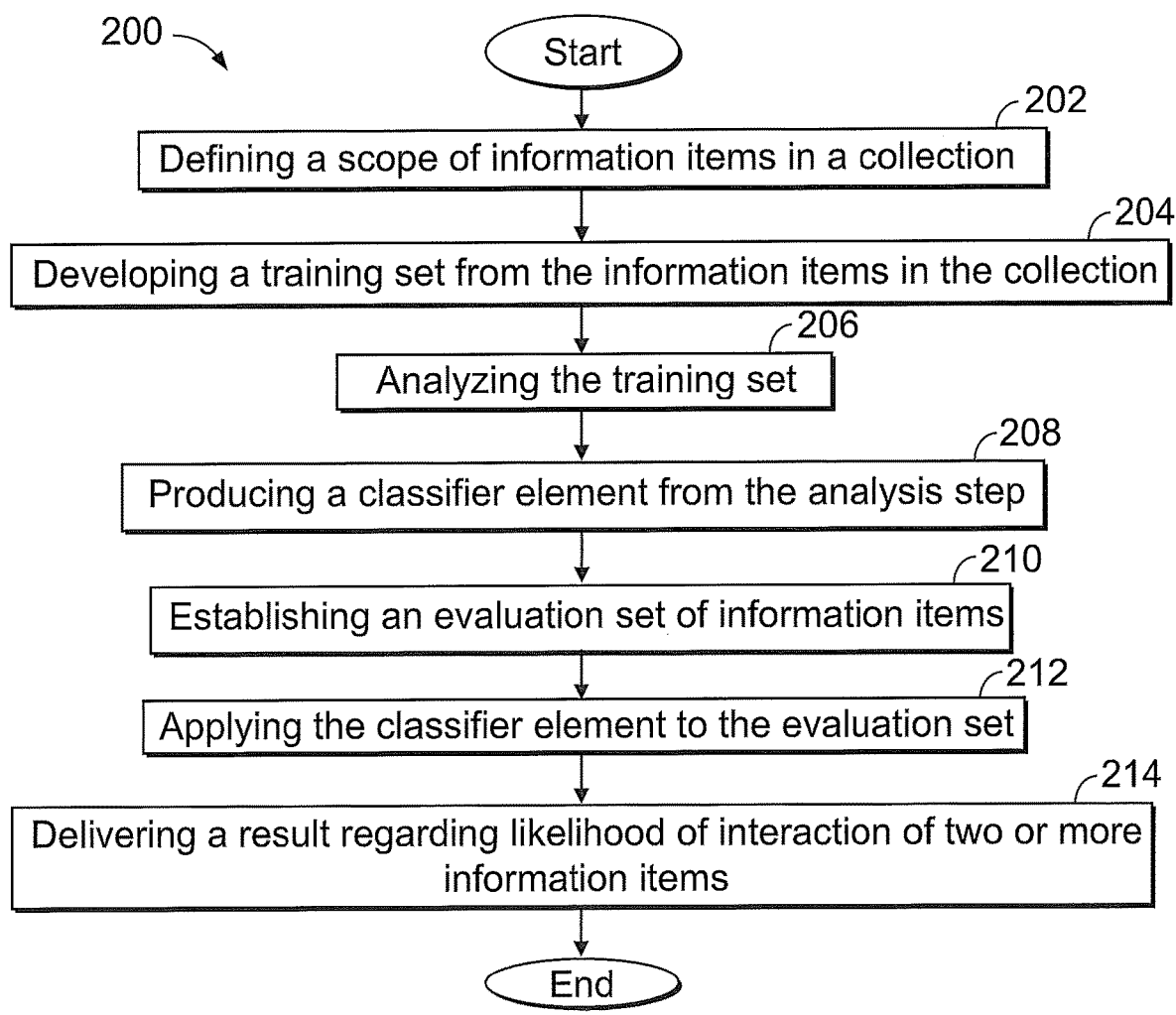
FIG. 2 illustrates a flowchart representing a method embodiment of the present invention.

Certain embodiments of the present invention include a method 200, as illustrated in FIG. 2. For example, a scope of information items to be included in a collection may be defined 202. In such step, two or more information items may be mined from data source units (which may be stored internal or external to the system, for example, in a storage component 102). Examples of data source units include published articles, published abstracts, raw data, catalogued data, or other collections of information. Examples of storage components include main memory, secondary memory, databases, indexes, files, or other retention systems.

Also, to define the scope of information items to be included, the user may apply some criteria (e.g., time range, quality, type of item, type of data source unit).

Certain embodiments of the present invention may be configured to process large amounts of information (e.g., "big data"). For example, a collection of information may include over 33,000 pairs of information items (e.g., over 16,000 positive pairs and 17,000 negative pairs) in a certain time frame (e.g., before the year 2011). The collections may be sub-divided to form sub-collections. Each sub-collection may be directed to information associated with, for example, a certain time frame, certain species (e.g., *Homo sapiens*, *Saccharomyces cerevisiae*, and *Schizosaccharomyces pombe*), certain publications, or some other relevant criteria. In time-based sub-collections, longitudinal datasets may be formed.

Figure 3:
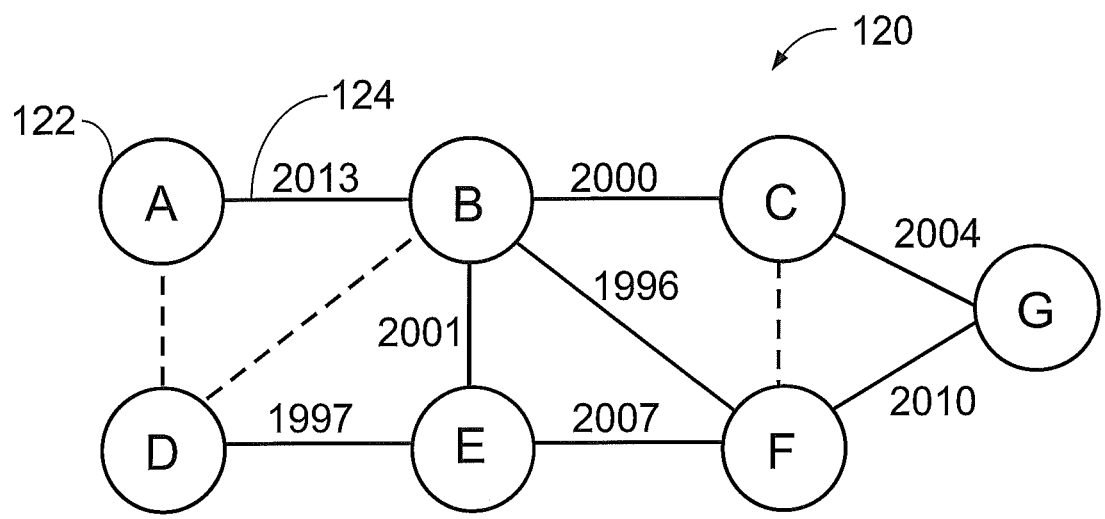
FIG. 3 illustrates an interaction network map according to the present invention.

Once the scope of known information items in the collection is defined, a map 120 may be built to illustrate any known relationships between the one or more information items, as illustrated in FIG. 3. In one embodiment of the interaction network map, the information items may be represented by nodes 122 and connections 124. A node may be assigned a "degree", which is the number of connections the node has to other nodes. Generally, low degree nodes have few interactions with other nodes, while high degree nodes—also termed "hubs"—have many interactions with other nodes.

Figure 4:
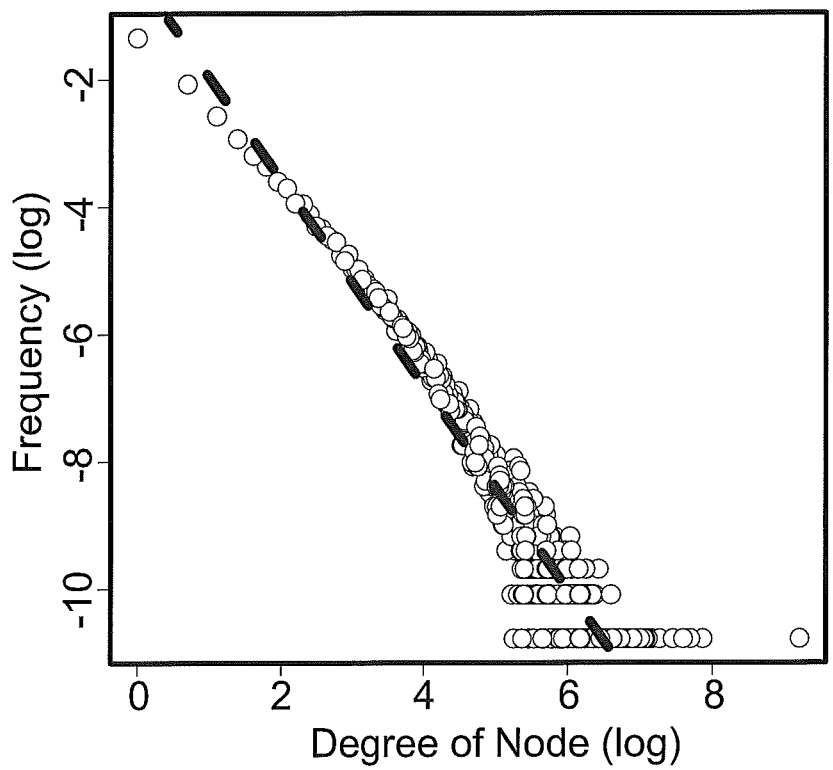
FIG. 4 illustrates a graph representing the frequency of degree of nodes in a dataset.

The degree of the nodes may follow the power law distribution. In certain embodiments, the node is calculated using log (frequency)=alpha−beta*log (degree). In one example in which over 48,000 nodes are identified and over 12,000 of them are known to have only one interaction, a mean degree may be 21, a median degree may be 4, minimum degree may be 1, maximum degree may be 10095, and a standard deviation may be 75. In such an embodiment, the alpha=0.36 and the beta=1.6 by linear regression. The adjusted r-squared is 0.9 and p-value <2.2e−16 for the linear regression. An example of a plot of the node degrees is shown in FIG. 4.

Next, a training set may be developed from all or some of the information items in the collection 204. In certain embodiments, the training set may include topic information items and publication information items. In certain embodiments, the topic information items may be configured as protein information items, such as characteristics or aspects of proteins themselves (e.g., name, amino acid sequence, functional groups, charge, polarity, hydrophobic/hydrophilic, date of discovery of aspect, or other physical or non-physical characteristics of the proteins, etc.). The publication information items may include information regarding publicly available article, document, or presentation, such information possibly including author(s), past occurrences of co-authorship between authors, other proteins cited or tagged in the same article, other proteins cited or tagged in articles in which certain co-authorship recurs, publication date, abstract, article title, periodical title, volume, issue no., other publication method, research fund source, institution with which the publication or author is associated, or other.

In an example, a training set may be constructed by using information before Year y to predict the new pairs in Year y. This approach may be applied from Year 1995 to Year 2012. For each year, 1000 positive and 1000 negative training instances from the data before y may be randomly selected from the collection to train the models.

The training set may be input into a training analysis component 104, which is configured to assess whether there are interactions between certain information items and then to recognize and extract features of the interaction(s) 206 or perform other types of analysis on the training set.

A "feature" is an individual measurable heuristic property of a phenomenon. Examples of features for publication information items may include Medical Subject Headings ("MeSH") terms—term for tags used in MEDLINE database articles—or other "tags" associated with publications. For purposes of this application, the similarity of the MeSH terms in publication history of two proteins is called "SimMeSH", which is described in more detail in Table 1.

Another feature—termed "JaccardArticleCoOccurence" for purposes of this application—, assumes that if two proteins are cited in the same article, they are related. JaccardArticleCoOccurence is also described in more detail in Table 1.

An additional feature—termed "SumPub" for purposes of this application—represents the research intensity between two proteins in certain embodiments and is also described in more detail in Table 1.

Certain features may be recognized by using information related to an interaction network map. Such features are termed "network features".

One network feature may include the number of "neighbor nodes" shared by two nodes in a network (each node representing an information item), which may be termed "numCommonNeighbor" and is described in more detail in Table 1. Another network feature may include the total number of neighbors collectively held by two nodes, which may be termed "sumNeighbor", and is described in more detail in Table 1. Possibly, connectivity of a node in the network is related to the likelihood that the information item represented by the node has additional relationships with other nodes/information items.

Yet another network feature may include the sum of two nodes' clustering coefficient, which is termed "sumClusteringCoef", and is described in more detail in Table 1. The clustering coefficient of vertex "v" in a graph is the proportion that v's neighbors connect among themselves. For example, assume "v" has 4 neighbors (meaning 6 possible connections among them), and there are actually 3 confirmed links (where each link represents a relationship between the information items of the respective nodes). In that example, the clustering coefficient is 0.5 (3/6).

Additional network features may include a Jaccard coefficient feature and Adamic feature, which are topological based measures that describe the pairs' common neighbors and generally are effective on link prediction task. These features are also described in more detail in Table 1.

tion items. For example, search terms such as protein names and synonyms could be used to identify a group of information items relevant to a specific hypothesis.

In another method step, the training analysis component 104 may produce a classifier element 208.

An evaluation set may be established from all or some of the information items in the collection 210. Typically, at least some information items not present in the training set are included in the evaluation set. In certain embodiments, all of the information items in the evaluation set were not included in the training set.

The evaluation set may be input into a prediction creation component, which may be configured to apply the classifier element to determine the likelihood of interaction between one or more information items in the evaluation set 212. In other words, new pairs of information items may be predicted by ranking the known pairs according to the probability produced by the classifier element. In link prediction task, there may be no absolute negative instance, as each pair that has no interaction so far may interact in the future. In certain embodiments, it may be assumed that the network is sparse and most of the pairs are not going to interact at all, where the model learns negative instances. Given a new pair, the model may be used to predict the probability of matching. If a pair has high rank in the dataset, it may be a possible interaction.

In certain embodiments, the training analysis component and possibly the prediction creation component may be using one or more supervised machine learning models. Examples of supervised machine learning models include Naïve Bayes (NB), Naive Bayes Multinomial (NBM), support vector machine (SVM), and logistic regression. The classifiers resulting from these four models typically perform well and generally are also robust, fast, and easy to implement.

When applying a Naïve Bayes model, the training analysis component may produce a Naive Bayes classifier, which

TABLE 1

| Category | Feature Name | Definition | Source |
|---|---|---|---|
| Text features | simMeSH | $\frac{|M(x) \cap M(y)|}{|M(x) \cup M(y)|}$. M(.) is the set of mesh terms | MEDLINE |
| | sumPub | of all the articles that mention the protein. $|Pub(x)| + |Pub(y)|$. Pub(.) is the set of publications that mention the protein. | MEDLINE |
| | jaccardArticleCoOccur | $\frac{|Pub(x) \cap Pub(y)|}{|Pub(x) \cup Pub(y)|}$. | MEDLINE |
| Network features | Adamic | $\sum_{z \in \Gamma(x) \cap \Gamma(y)} \frac{1}{|\log(\Gamma(z))|}$. | BioGRID |
| | numCommonNeighbor | $|\Gamma(x) \cap \Gamma(y)|$. $\Gamma(.)$ is the set of neighbors. | BioGRID |
| | Jaccard | $\frac{|\Gamma(x) \cap \Gamma(y)|}{|\Gamma(x) \cup \Gamma(y)|}$. | BioGRID |
| | sumNeighbor | $|\Gamma(x)| + |\Gamma(y)|$. | BioGRID |
| | sumClusteringCoef | clustering_coef(x) + clustering_coef(y). | BioGRID |

To more quickly and easily analyze the training set, the records in a database of known information items (e.g., MEDLINE, BioGRID, other collection or sub-collection of information items) may be indexed. Indexing also may permit extracting features from that collection of informais a simple probabilistic classifier based on applying Bayes's theorem with the strong (naive) independence assumption that the features are generated independently from each other given the instance label.

A Naïve Bayes Multinomial model includes an assumption that the conditional probability of the feature given a class follows multinomial distribution.

SVMs are based on the concept of maximum margin decision planes that define generalizable decision boundaries for classification and regression. An SVM constructs a hyperplane to maximize the margin between the data points and the hyperplane, often after mapping the data points to a higher dimensional space in which they are linearly separable or close.

The training set also may be subjected to a 10-fold cross validation, the results of which are illustrated in Table 2 (for an example dataset).

TABLE 2

| Model | ROC | Precision | Recall | F1 |
| --- | --- | --- | --- | --- |
| Naïve Bayes | 0.832 | 0.787 | 0.697 | 0.668 |
| Naïve Bayes Multinomial | 0.738 | 0.639 | 0.618 | 0.607 |
| SVM | 0.765 | 0.771 | 0.766 | 0.765 |
| Logistic | 0.856 | 0.781 | 0.772 | 0.769 |

Logistic regression may achieve high performance, e.g., with 0.856 ROC and 0.769 F1 for one dataset. Naïve Bayes model may have the second best at 0.832 ROC and 0.668 F1. Naïve Bayes Multinomial and SVM may not be as useful as the previous two, with 0.738 and 0.765 ROC respectively, for certain embodiments.

The features identified may be ranked using information in the training set analysis to examine each feature's contribution to the information gained, as illustrated in Table 3. Neighbor-based features, e.g., Adamic, numCommonNeighbor, Jaccard, and sumNeighbor may rank relatively high.

TABLE 3

| Rank | Feature | Information Gain |
| --- | --- | --- |
| 1 | Adamic | 0.306 |
| 2 | numCommonNeighbor | 0.291 |
| 3 | Jaccard | 0.287 |
| 4 | sumNeighbor | 0.176 |
| 5 | sumPub | 0.135 |
| 6 | simMeSH | 0.122 |
| 7 | sumClusteringCoef | 0.105 |
| 8 | jaccardArticleCoOccur | 0.0382 |

In addition, models may be tested for their performance level relative to a random classifier. An example of such a test is illustrated in Table 4 To quantify quality prediction, an embodiment of the SML model may utilize an existing high quality data set, for example, a collection of protein-protein interactions (the BioGRID database) manually curated by biologists. As shown in Table 4, the SML model can predict thousands of predictions automatically with the best performing model of >90% F1 score or accuracy, a high precision or quality prediction.

TABLE 4

| Model | ROC | Precision | Recall | F1 |
| --- | --- | --- | --- | --- |
| Naïve Bayes | 0.95 | 0.876 | 0.841 | 0.837 |
| Naïve Bayes Multinomial | 0.917 | 0.804 | 0.783 | 0.78 |
| SVM | 0.911 | 0.911 | 0.911 | 0.911 |
| Logistic | 0.946 | 0.911 | 0.911 | 0.911 |
| Random Baseline | — | 0.503 | 0.509 | 0.506 |

After a classifier is applied to an evaluation set, the output may include information related to likelihood of interaction between any two or more information items or just information item pairs. The likelihood of interaction may be termed "relationship value". The relationship value for each pair of information items may be ranked according to size and/or converted into a results graphical representation for display via a display unit.

Figure 5A:
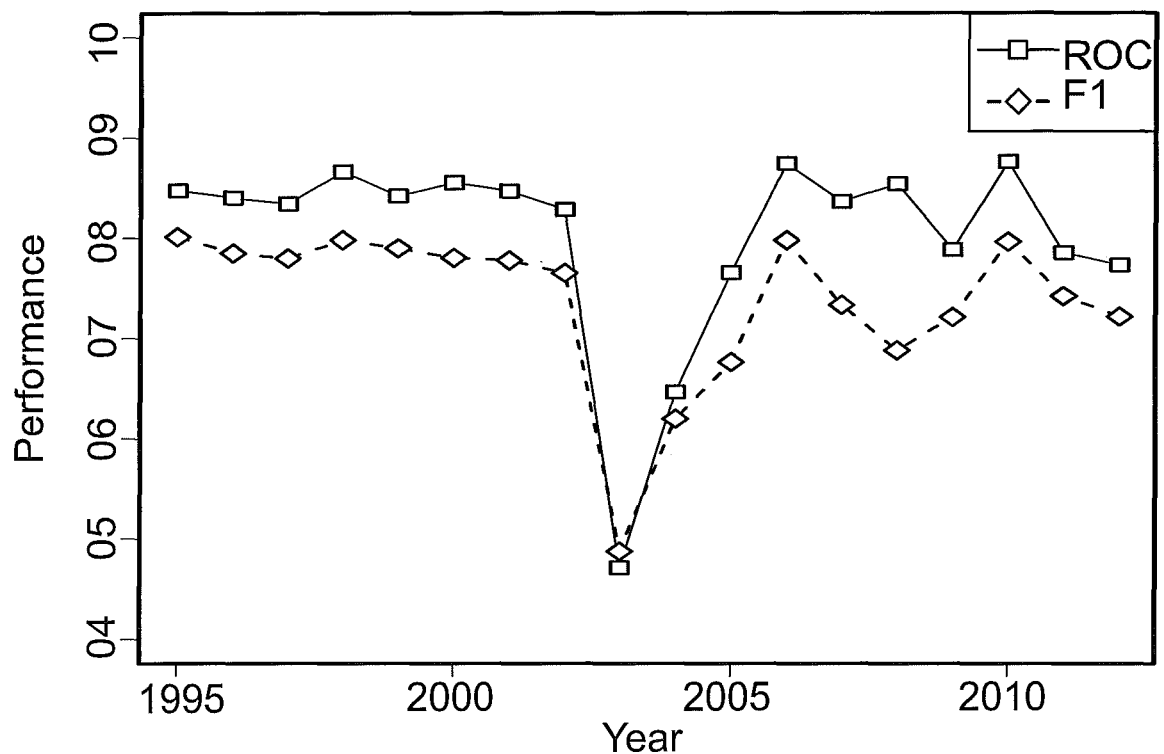
FIG. 5A illustrates a graphical representation of a collection of performance results.
Figure 5B:
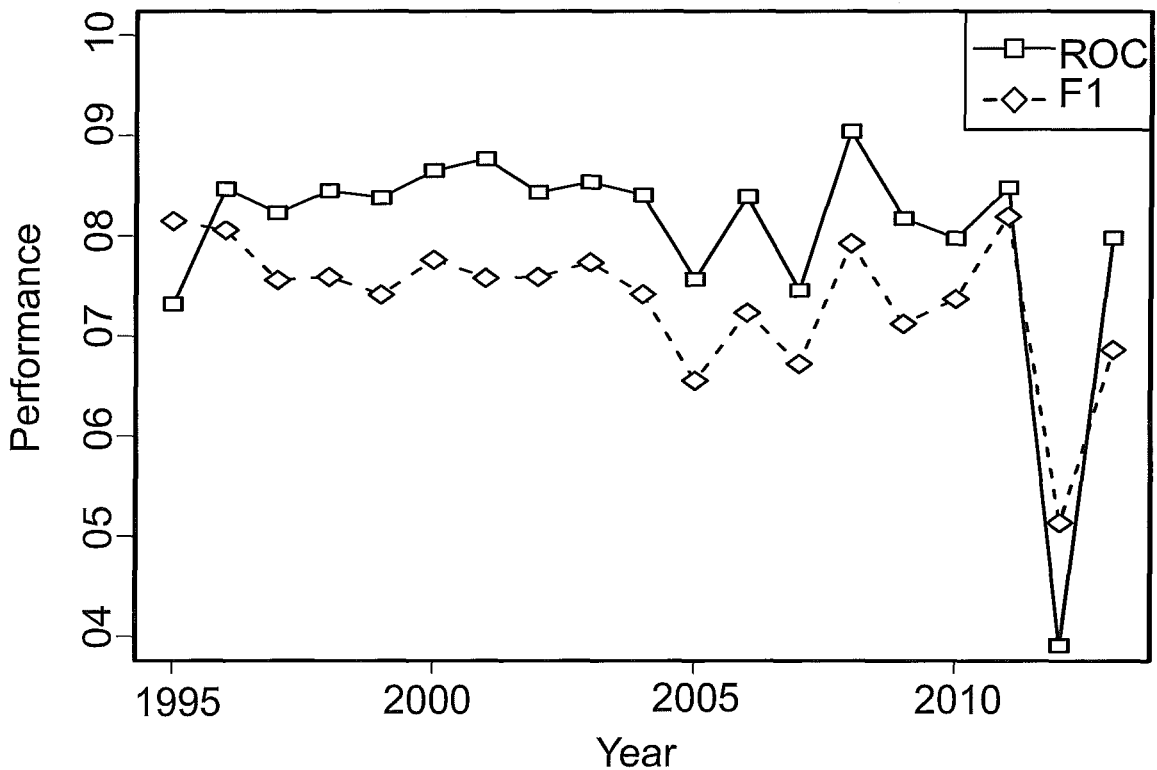
FIG. 5B illustrates a graphical representation of a subcollection (*Homo sapiens*) of performance results.
Figure 5C:
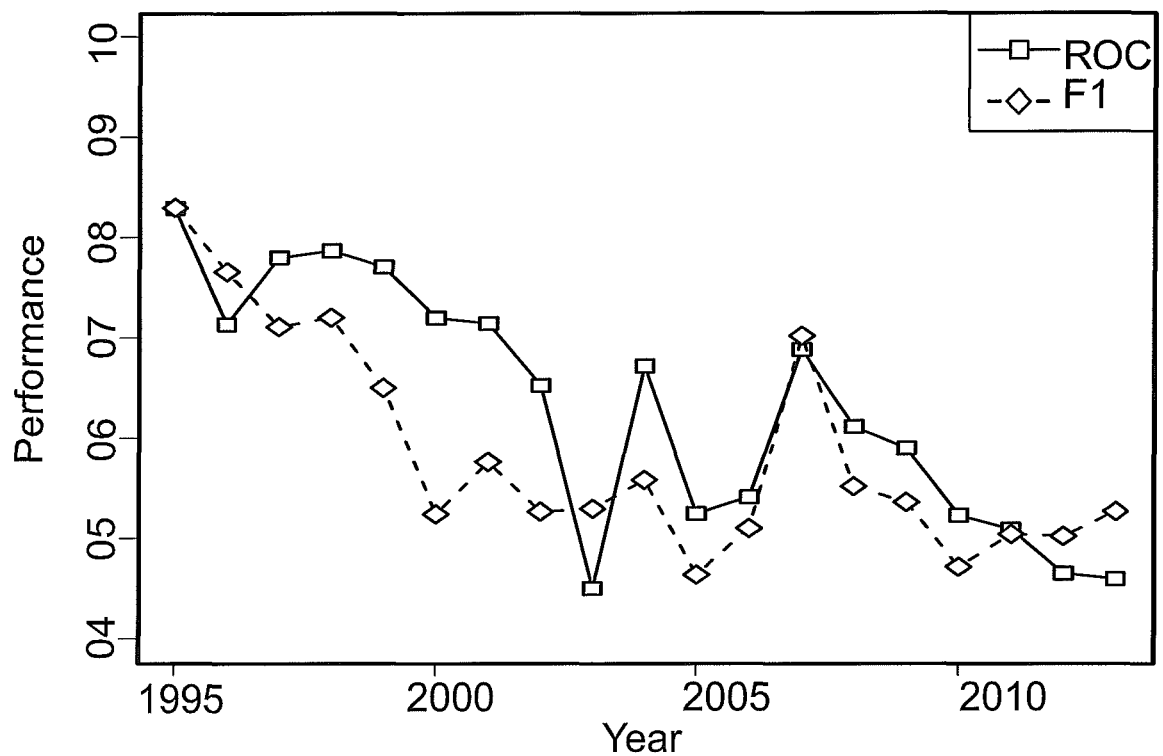
FIG. 5C illustrates a graphical representation of a subcollection (*Saccharomyces cerevisiae*) of performance results.
Figure 5D:
FIG. 5D illustrates a graphical representation of a subcollection (*Schizosaccharomyces pombe*) of performance results.

Examples of graphical representations of results are illustrated in FIG. 5A-5D. Each results graphical representation illustrates performance of a model used to predict next year's discoveries regarding information item interactions. FIG. 5A is for a whole collection, while FIG. 5B-FIG. 5D are for sub-collections (*Homo sapiens*, *Saccharomyces cerevisiae*, and *Schizosaccharomyces pombe*, respectively).

Figure 6:
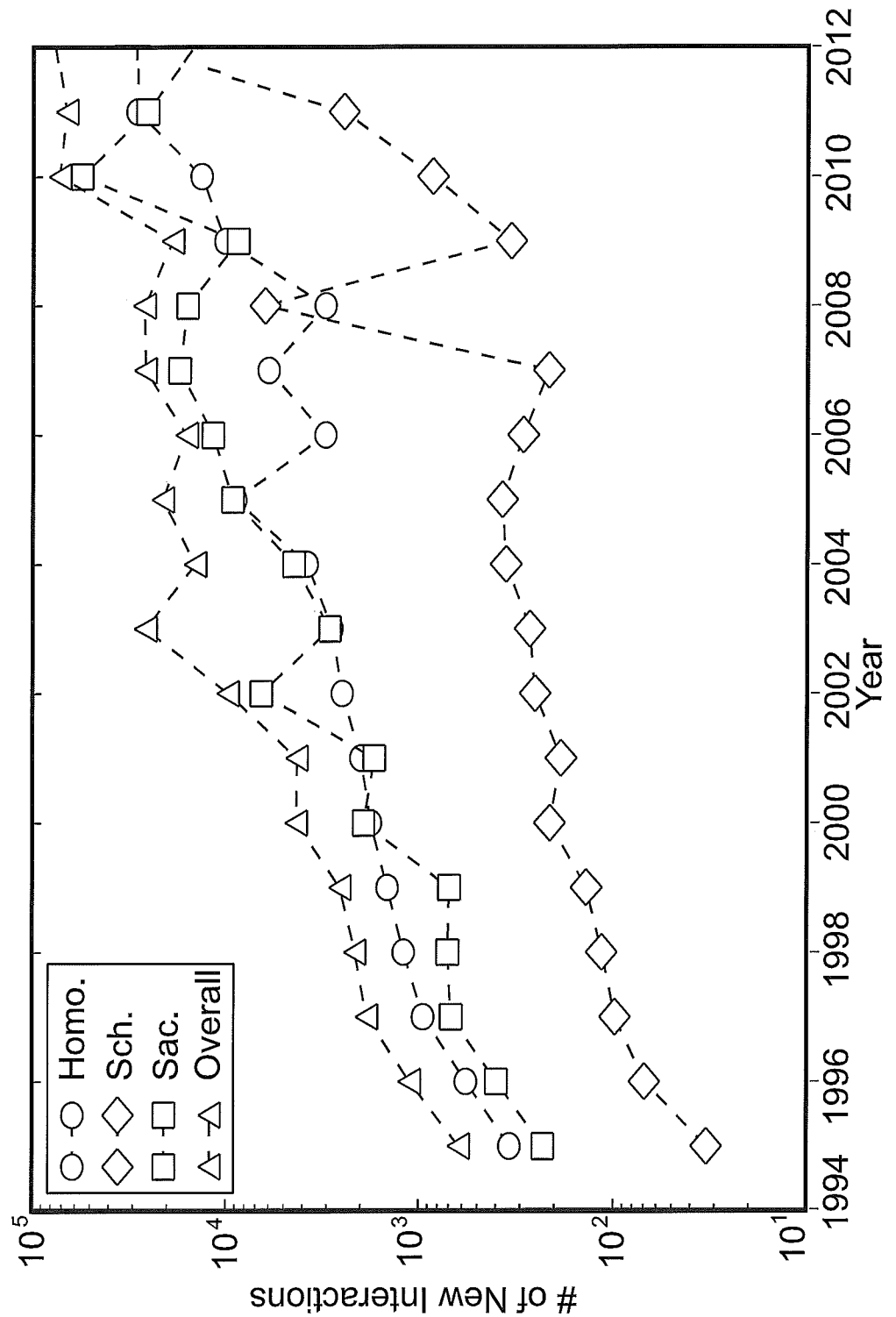
FIG. 6 illustrates a graphical representation of new interactions per year.

FIG. 6 illustrates the actual new interactions discovered between years 1995-2012.

Figure 7:
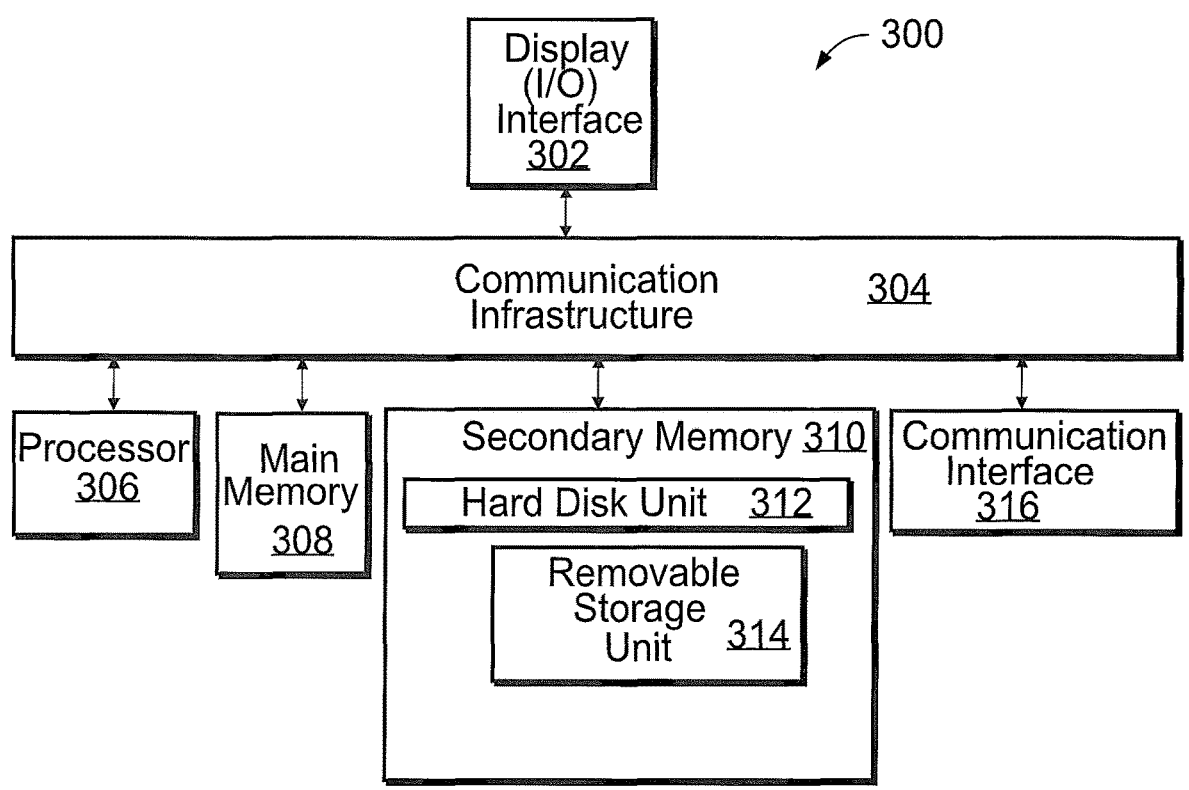
FIG. 7 illustrates a computer system according to an embodiment of the present invention.

FIG. 7 illustrates an exemplary computer system 300 that may be used to implement the methods according to the invention. One or more computer systems 300 may carry out the methods presented herein as computer code.

Computer system 300 includes an input/output display interface 302 connected to communication infrastructure 304—such as a bus—, which forwards data such as graphics, text, and information, from the communication infrastructure 304 or from a frame buffer (not shown) to other components of the computer system 300. The input/output display interface 302 may be, for example, a keyboard, touch screen, joystick, trackball, mouse, monitor, speaker, printer, Google Glass® unit, webcamera, any other computer peripheral device, or any combination thereof, capable of entering and/or viewing data.

Computer system 300 includes one or more processors 306, which may be a special purpose or a general-purpose digital signal processor that processes certain information. Computer system 300 also includes a main memory 308, for example random access memory ("RAM"), read-only memory ("ROM"), mass storage device, or any combination thereof. Computer system 300 may also include a secondary memory 310 such as a hard disk unit 312, a removable storage unit 314, or any combination thereof. Computer system 300 may also include a communication interface 316, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 308, secondary memory 310, communication interface 316, or a combination thereof, function as a computer usable storage medium, otherwise referred to as a computer readable storage medium, to store and/or access computer software including computer instructions. Certain embodiments of a computer readable storage medium do not include any transitory signals or waves. For example, computer programs or other instructions may be loaded into the computer system 300 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 314 or hard disc unit 312 to the secondary memory 310 or through the communication infrastructure 304 to the main memory 308 of the computer system 300.

Communication interface 316 allows software, instructions and data to be transferred between the computer system 300 and external devices or external networks. Software, instructions, and/or data transferred by the communication interface 316 are typically in the form of signals that may be electronic, electromagnetic, optical or other signals capable of being sent and received by the communication interface 316. Signals may be sent and received using wire or cable, fiber optics, a phone line, a cellular phone link, a Radio Frequency ("RF") link, wireless link, or other communication channels.

Computer programs, when executed, enable the computer system 300, particularly the processor 306, to implement the methods of the invention according to computer software including instructions.

The computer system 300 described herein may perform any one of, or any combination of, the steps of any of the methods presented herein. It is also contemplated that the methods according to the invention may be performed automatically, or may be invoked by some form of manual intervention.

The computer system 300 of FIG. 7 is provided only for purposes of illustration, such that the invention is not limited to this specific embodiment. It is appreciated that a person skilled in the relevant art knows how to program and implement the invention using any computer system.

The computer system 300 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch®, or iPhone®.

Figure 8:
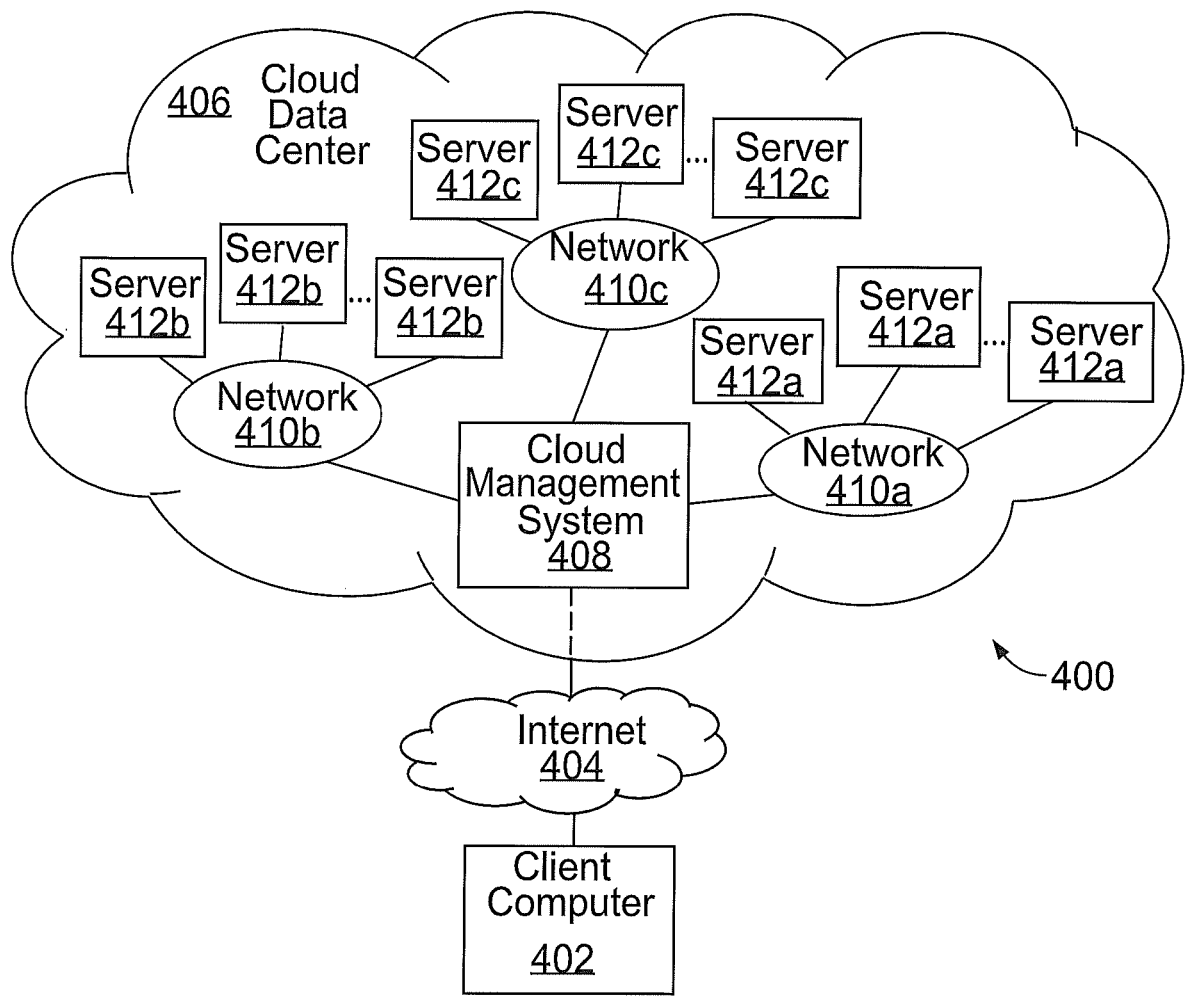
FIG. 8 illustrates a cloud computing system according to an embodiment of the present invention.

FIG. 8 illustrates an exemplary cloud computing system 400 that may be used to implement the methods according to the present invention. The cloud computing system 400 includes a plurality of interconnected computing environments. The cloud computing system 400 utilizes the resources from various networks as a collective virtual computer, where the services and applications can run independently from a particular computer or server configuration making hardware less important.

Specifically, the cloud computing system 400 includes at least one client computer 402. The client computer 402 may be any device through the use of which a distributed computing environment may be accessed to perform the methods disclosed herein, for example, a traditional computer, portable computer, mobile phone, personal digital assistant, tablet to name a few. The client computer 402 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 402 also includes a communications interface, for example, a modem, a network interface (such as an Ethernet card), a communications port, a PCMCIA slot and card, wired or wireless systems, etc. The communications interface allows communication through transferred signals between the client computer 402 and external devices including networks such as the Internet 404 and cloud data center 406. Communication may be implemented using wireless or wired capability such as cable, fiber optics, a phone line, a cellular phone link, radio waves or other communication channels.

The client computer 402 establishes communication with the Internet 404—specifically to one or more servers—to, in turn, establish communication with one or more cloud data centers 406. A cloud data center 406 includes one or more networks 410a, 410b, 410c managed through a cloud management system 408. Each network 410a, 410b, 410c includes resource servers 412a, 412b, 412c, respectively. Servers 412a, 412b, 412c permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 408 can comprise a dedicated or centralized server and/or other software, hardware, and network tools to communicate with one or more networks 410a, 410b, 410c, such as the Internet or other public or private network, with all sets of resource servers 412a, 412b, 412c. The cloud management system 408 may be configured to query and identify the computing resources and components managed by the set of resource servers 412a, 412b, 412c needed and available for use in the cloud data center 406. Specifically, the cloud management system 408 may be configured to identify the hardware resources and components such as type and amount of processing power, type and amount of memory, type and amount of storage, type and amount of network bandwidth and the like, of the set of resource servers 412a, 412b, 412c needed and available for use in the cloud data center 406. Likewise, the cloud management system 408 can be configured to identify the software resources and components, such as type of Operating System ("OS"), application programs, and the like, of the set of resource servers 412a, 412b, 412c needed and available for use in the cloud data center 406.

The present invention is also directed to computer products, otherwise referred to as computer program products, to provide software to the cloud computing system 400. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 400 of FIG. 8 is provided only for purposes of illustration and does not limit the invention to this specific embodiment. It is appreciated that a person skilled in the relevant art knows how to program and implement the invention using any computer system or network architecture.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for automatically predicting a protein-drug interaction comprising:
a processor:
a main memory in communication with said processor via a communication infrastructure and storing instructions that, when executed by said processor, cause the processor to:
access a collection including at least two or more information items;
develop a training set from the at least two or more information items in the collection, the at least two or more information items comprising a protein information item and a drug information item;
analyze the training set using one or more machine learning models selected from the group consisting of a Naive Bayes, a Naive Bayes Multinomial, and a support vector machine, wherein the analyze step further includes a step of identifying one or more interactions between pairs of protein-drug information items and extracting two or more features of the one or more interactions, the two or more extracted features selected from the group consisting of Adamic, numeommonNeighbor, Jaccard, sum Neighbor, sum Pub, simMeSH, sum Glusteringoef, and jaccardArticleeoOccur;
produce a classifier element based upon the analysis of the training set, wherein the classifier element is selected from the group consisting of a Naive Bayes classifier that assumes features are generated independently from each other, a Naive Bayes Multinomial classifier that assumes a conditional probability of features follows multinomial distribution, and a support vector machine classifier defining decision boundaries of features;
establish an evaluation set comprising new pairs of protein-drug information items, each new pair consisting of a new protein information item and new drug information item;
apply the classifier element to the new pairs of protein-drug information items in the evaluation set producing a probability value for each of the new pairs of protein-drug information items;
rank each classified pair of protein-drug information items in a data set from a high probability value to a low probability value; and
predict a likelihood of interaction between the new protein information item and the new drug information item of each ranked pair, wherein a higher probability value of a ranked pair indicates a higher likelihood of interaction between the new protein information item and the new drug information item in the ranked pair; and
deliver an output comprising the likelihood of interaction between the new protein information item and the new drug information item of each new pair in the evaluation set,
wherein said main memory in communication with the processor via the communication infrastructure stores instructions that, when executed by said processor, cause said processor to display a graphical representation configured to convey at least known relationships between information items;
wherein the graphical representation includes a node symbol configured to represent the information items and a link symbol configured to represent any relationships between the information items;
wherein a degree is calculated for the node symbol.

2. The system of claim 1, wherein the protein information item is a type of protein.

3. The system of claim 2, wherein the drug information item is a publication.

4. The system of claim 1, wherein the drug information item is a type of pharmaceutical drug.

5. The system of claim 1, wherein the two or more information items further include a first publication date of a publication.

6. The system of claim 1, wherein the two or more information items further include an authorship of a publication.

7. The system of claim 1, wherein the two or more information items further include a co-authorship of two or more publications.

8. The system of claim 1, wherein the two or more information items further include an identification tag of a publication.

9. A system of claim 1, wherein said main memory in communication with said processor via the communication infrastructure stores instructions that, when executed by said processor, cause said processor to display a graphical representation configured to convey predicted relationships between the information items.

10. A system for automatically predicting a protein-drug interaction comprising:
a processor:
a main memory in communication with said processor via a communication infrastructure and storing instructions that, when executed by said processor, cause the processor to:
form a collection including at least two or more information items;
develop a training set from the at least two or more information items in the collection, the two or more information items comprising a protein information item and a drug information item;
analyze the training set using one or more machine learning models selected from the group consisting of a Naive Bayes, a Naive Bayes Multinomial, and a support vector machine, wherein the analyze step further includes a step of identifying one or more interactions between pairs of protein-drug information items and extracting two or more features of the one or more interactions, the two or more extracted features selected from the group consisting of Adamic, numeommonNeighbor, Jaccard, sum Neighbor, sum Pub, simMeSH, sum Glusteringoef, and jaccardArticleeoOccur;
produce a classifier element based upon the analysis of the training set, wherein the classifier element is selected from the group consisting of a Naive Bayes classifier that assumes features are generated independently from each other, a Naive Bayes Multinomial classifier that assumes a conditional probability of features follows multinomial distribution, and a support vector machine classifier defining decision boundaries of features;
establish an evaluation set comprising new pairs of protein-drug information items, each new pair consisting of a new protein information item and a new drug information item;

apply the classifier element to the new pairs of protein-drug information items in the evaluation set producing a probability value for each of the new pairs of protein-drug information items;

rank each classified pair of protein-drug information items in a data set from a high probability value to a low probability value;

predict a likelihood of interaction between the new protein information item and the new drug information item of each ranked pair, wherein a higher probability value of a ranked pair indicates a higher likelihood of interaction between the new protein information item and the new drug information item of that ranked pair; and deliver an output comprising the likelihood of interaction between the new protein information item and the new drug information item of each of the new pairs in the evaluation set, wherein said main memory in communication with the processor via the communication infrastructure stores instructions that, when executed by said processor, cause said processor to display a graphical representation configured to convey at least known relationships between information items;

wherein the graphical representation includes a node symbol configured to represent the information items and a link symbol configured to represent any relationships between the information items;

wherein a degree is calculated for the node symbol.

11. The system of claim 10, wherein the training set is indexed to facilitate analysis of the training set.

12. The system of claim 10, wherein the evaluation set is indexed to facilitate analysis of the evaluation set.

13. The system of claim 10, wherein the protein information item is a type of protein.

14. The system of claim 10, wherein the drug information item is a publication.

15. The system of claim 10, wherein the drug information item is a type of pharmaceutical drug.

* * * * *